Patented Oct. 15, 1929

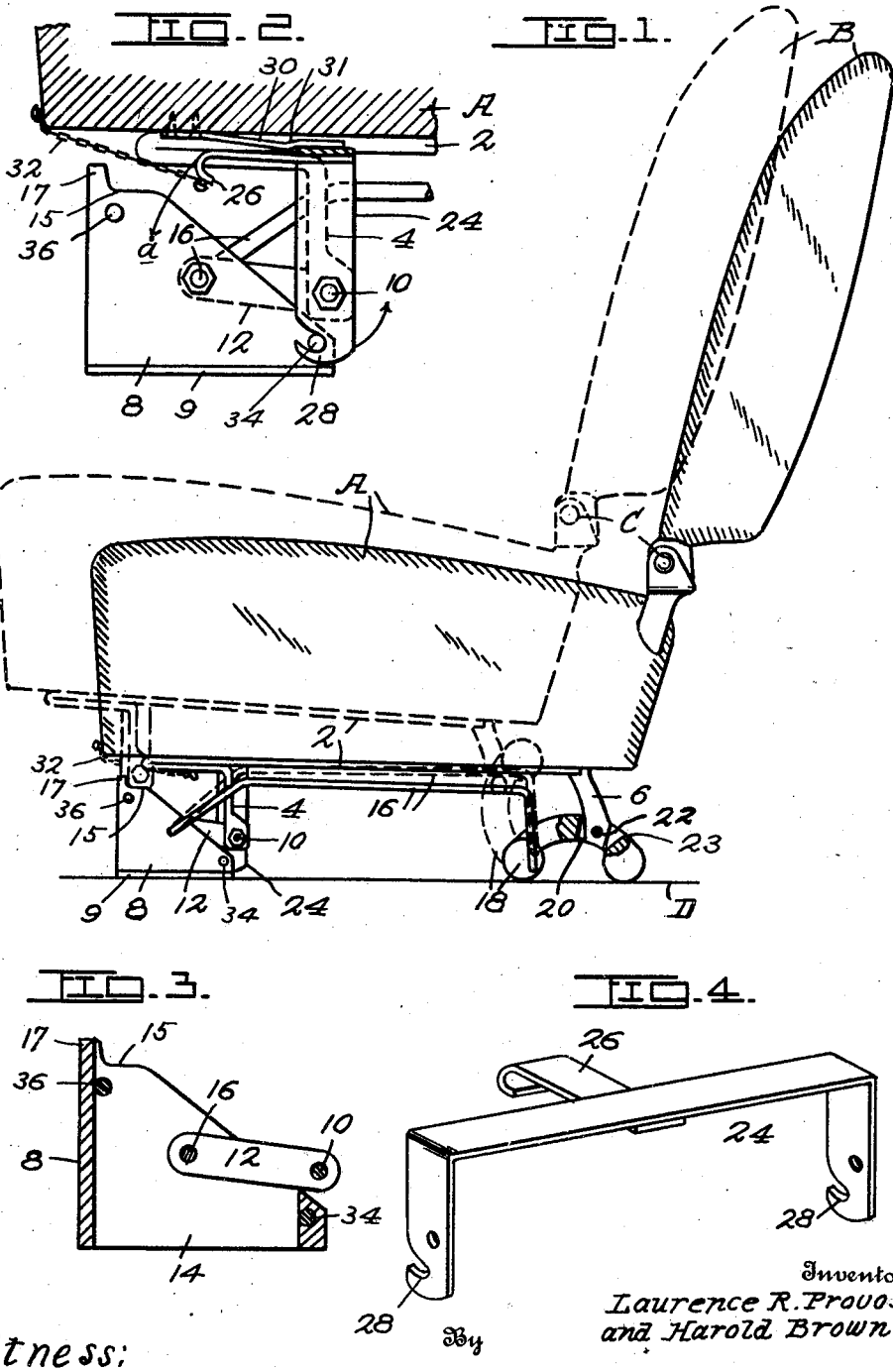

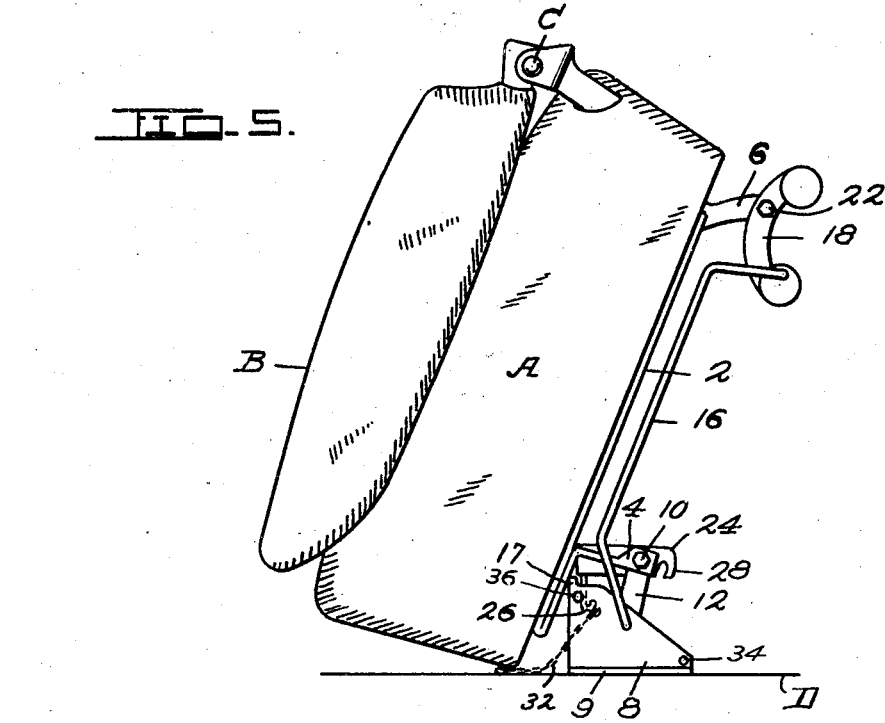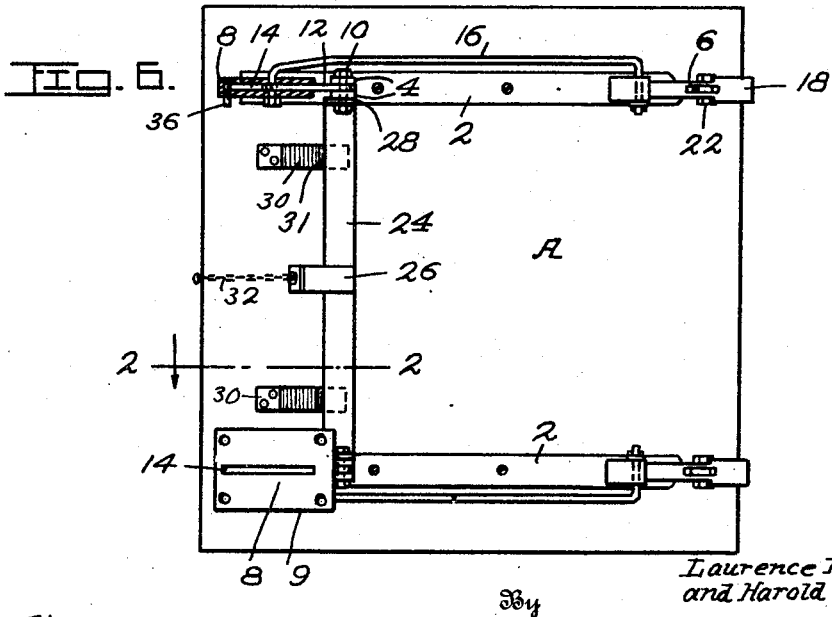

1,732,169

UNITED STATES PATENT OFFICE

LAURENCE R. PROVOST, OF SHAWNEE, AND HAROLD BROWN, OF KANSAS CITY, KANSAS

ADJUSTABLE SEAT

Application filed July 13, 1927. Serial No. 205,402.

Our invention relates to improvements in adjustable seats and one object is to provide a seat which can be readily adjusted to forward and backward positions. A further object is to provide a seat in which vertical adjustment is had with the forward and backward movements.

Another object is to provide a seat which can be arranged close to the floor of a motor vehicle, airplane, boat, or other vehicle and tilted out of the way to provide a passage for persons entering and leaving such vehicle.

Another object is to provide rear supports for the seat which will move upwardly with the latter when tipped and leave no obstructions for persons to trip over when using the passageway.

A further object is to provide a seat which is automatically locked against movement when adjusted to the different sitting positions.

In the accompanying drawings which show one embodiment of the invention:

Fig. 1 is a side elevation of the invention with the seat adjusted to its backward and lowermost position in full lines, and to its forward and raised position in dotted lines.

Fig. 2 is a slightly enlarged fragmentary section on line 2—2 of Fig. 6.

Fig. 3 is a vertical section of a bracket employed in carrying out the invention.

Fig. 4 is a detail perspective view of a latch bar.

Fig. 5 shows the seat tilted upwardly and forwardly to provide a passageway.

Fig. 6 is an inverted plan view of the seat and the mechanism constituting the invention.

Referring in detail to the different parts, A designates a seat which has a back B connected thereto by hinges C, so that said back may be raised to the position disclosed by Fig. 1, or folded upon the seat as shown by Fig. 5.

The seat A is fixedly mounted upon a pair of supporting members 2 having rigid downwardly extending front and rear arms 4 and 6, respectively. The front arms 4 are spaced backwardly from the front ends of the supporting members 2 in order to clear the top of a pair of brackets 8 when the seat A is tilted forwardly and upwardly to the position disclosed by Fig. 5, to provide a passageway to and from a rear seat, not shown, when the invention is installed in a vehicle having front and rear seats.

The lower ends of the arms 4 are bifurcated to straddle a pair of links 12 which are connected to said arms 4 by pivots 10 and extend into the slotted portions 14 of the brackets 8. The links 12 are swingably mounted upon the forward ends of a pair of connecting rods 16 which are bent at right-angles to extend transversely through said links and the brackets 8, which latter have flanges 9 adapted to be secured to the floor D of the vehicle.

The connecting rods 16 are arched as shown by Fig. 1, so that packages or other articles may be placed beneath the seat A, and the rear ends of said connecting rods 16 are pivotally connected to a pair of legs 18 having slotted portions 20 into which the lower ends of the rear arms 6 project and are secured by pivots 22. The legs 18 have front and rear feet 18$^a$ and 18$^b$, respectively, upon which they rest when the seat A is in the full line position, Fig. 1.

24 designates an inverted U-shaped latch bar which is provided with a forwardly projecting handle 26 and latch members 28. The latch members 28 are formed integral with the lower ends of the latch bar 24, which latter is operably connected to the front arms 4 by means of the pivots 10.

34 and 36 designate studs projecting laterally from the brackets 8 for engagement by the latch members 28.

30 designates a pair of springs secured to the underside of the seat A and provided with shoulders 31 adapted to engage the front margin of the latch bar 24 for securing the latter in the active position disclosed by Figs. 1, 2 and 6.

32 designates a chain or cable secured at its ends to the seat A and the handle 26 for preventing the latter from swinging downwardly and striking the floor D of the vehicle when the latch members 28 are disengaged from the studs 34.

In practice the seat A is secured in its lower and rearmost position shown by full lines Fig. 1, by engaging the latch members 28 with the studs 34. This prevents the rear ends of the links 12 from swinging upwardly and they in turn prevent the supporting members 2 and the seat A from moving forwardly. When it is desired to adjust the seat A forwardly and upwardly to the dotted line position, Fig. 1, the handle 26 is grasped and pulled downwardly in the direction of the arrow $a$, Fig. 2, with sufficient force to disengage the latch bar 24 from the shoulders 31 of the springs 30 and swing the latch members 28 out of engagement with the studs 34. The seat A is then pushed upwardly and forwardly until the lower ends of the arms 4 come to rest in the seats 15 at the upper forward portions of the brackets 8, which are provided with stops 17 to check the forward movement of said arms 4. The seat A is then locked in the last-mentioned position by pushing the handle 26 in a reverse direction to the arrow $a$ until the latch members 28 engage the studs 36 and the upper front margin of the latch bar 24 engages the rear of the shoulders 31 on the springs 30. When the seat A is adjusted to the dotted line position Fig. 1, as above stated, the rear ends of the legs 18 are rocked upwardly upon the feet $18^a$ by the arms 6 and support the rear portion of the seat A in raised position. The legs 18 are reliably held in raised position upon the feet $18^a$ by the arms 6 and the connecting rods 16, which latter hold the feet $18^a$ from forward or backward movement and are relieved of practically all stress by the ends 23 of the slots 20 bearing against said arms 6.

The seat A may be tilted to the position shown by Fig. 5, from either the full or dotted line positions disclosed by Fig. 1, by first disengaging the latch members 28 from the studs. As the seat A is tilted, the rear legs 18 are carried upwardly by the arms 6 and hence no obstruction is left upon the floor D for passengers to trip over when entering or leaving the rear portion of the vehicle. The legs 18 are also drawn by the connecting rods 16 to a position approximately parallel with the bottom of the seat A, so that said legs will not project in the way of the passengers. When the seat A is moved from one position to another it is guided by the links 12 swinging in the slots 14 of the brackets 8.

From the foregoing description it is apparent that we have provided an adjustable seat embodying the advantages above pointed out, and while we have shown and described the preferred construction, combination and arrangement of parts, we reserve all rights to such changes and modifications as properly fall within the spirit and scope of the invention as claimed.

Having thus described our invention, what we claim and desire to secure by Letters Patent, is:

1. In combination, seat supporting members adapted to be adjusted forwardly and backwardly, brackets for supporting the front portions of said supporting members when the latter are in their forward position, swingable elements operably connecting said brackets and the seat supporting members, a latch bar operably connected to said swingable elements and the seat supporting members for securing the latter in their forward and backward positions, and elements upon the brackets for coacting with said latch bar in securing the seat supporting members in their forward and backward positions.

2. In combination with a seat, a pair of supporting members for supporting said seat in different positions, brackets for supporting the front portions of said supporting members when the latter are in their forward position, swingable elements operably connecting said brackets and the seat supporting members, a latch bar operably connected to said swingable elements and the seat supporting members for securing the latter in their forward and backward positions, elements upon the brackets for coacting with said latch bar in securing the seat supporting members in their forward and backward positions, and spring means secured to the seat for holding said latch bar in engagement with said coacting elements.

3. In combination, seat supporting members adapted to be adjusted forwardly and backwardly, brackets for supporting the front portions of said seat supporting members when the latter are in their forward position, swingable elements operably connecting said brackets and the seat supporting members, a U-shaped latch bar operably connected to the seat supporting members for securing the latter in their forward and backward positions, a handle secured to said latch bar, and means upon the brackets for coacting with said latch bar in securing the seat supporting members in their forward and backward positions.

4. The combination with a seat adapted to be adjusted to forward and backward sitting positions, adjustable supporting means for the forward portion of said seat, stationary supports for said adjustable supporting means, legs having front and rear feet upon which they rest when the seat is in backward position, means connected to the seat and said legs for rocking the latter upon the front feet when the seat is adjusted forwardly, and rods operably connected to the stationary supports and the front feet of said legs.

5. In combination with a seat, seat supporting members adapted to be adjusted forwardly and backwardly, stationary supporting means to which the forward portions of said seat supporting members are operably connected, and a latch bar operably connected to the forward portions of the seat supporting members and coacting with said stationary supporting means in securing said seat supporting members in forward and backward positions.

6. In combination with a seat, seat supporting members adapted to be adjusted forwardly and backwardly, stationary supporting means to which the forward portions of said seat supporting members are operably connected, a latch bar operably connected to the forward portions of the seat supporting members and coacting with said stationary supporting means in securing said seat supporting members in forward and backward positions, and spring means secured to the seat for yieldably holding said latch bar in active position.

In testimony whereof we affix our signatures.

LAURENCE R. PROVOST.
HAROLD BROWN.